(12) United States Patent
Ludin et al.

(10) Patent No.: US 10,598,251 B2
(45) Date of Patent: Mar. 24, 2020

(54) VIBRATION DAMPING LINK AND METHOD THEREFORE

(71) Applicant: The Boeing Company, Chicago, IL (US)

(72) Inventors: Douglas R. Ludin, Malvern, PA (US); Matthew S. Stauffer, Bridgeport, PA (US)

(73) Assignee: The Boeing Company, Chicago, IL (US)

( * ) Notice: Subject to any disclaimer, the term of this patent is extended or adjusted under 35 U.S.C. 154(b) by 190 days.

(21) Appl. No.: 15/487,603

(22) Filed: Apr. 14, 2017

(65) Prior Publication Data

US 2018/0298978 A1    Oct. 18, 2018

(51) Int. Cl.
| | | |
|---|---|---|
| *F16F 15/08* | (2006.01) | |
| *B64D 27/26* | (2006.01) | |
| *F16F 1/44* | (2006.01) | |
| *F16F 3/087* | (2006.01) | |

(52) U.S. Cl.
CPC ............. *F16F 15/08* (2013.01); *B64D 27/26* (2013.01); *F16F 1/445* (2013.01); *F16F 3/0876* (2013.01); *B64D 2027/262* (2013.01); *F16F 2224/025* (2013.01); *F16F 2230/0052* (2013.01); *F16F 2230/0076* (2013.01); *F16F 2236/04* (2013.01); *F16F 2236/045* (2013.01); *F16F 2236/06* (2013.01); *F16F 2236/12* (2013.01)

(58) Field of Classification Search
CPC .... F16F 1/44; F16F 1/445; F16F 15/08; F16F 3/0876

USPC .......................................................... 267/70
See application file for complete search history.

(56) References Cited

U.S. PATENT DOCUMENTS

| | | | | |
|---|---|---|---|---|
| 1,744,551 | A * | 1/1930 | Karcher .................. | B64C 25/64 267/171 |
| 4,074,896 | A * | 2/1978 | Eftefield ............... | E02F 3/8157 172/816 |
| 4,111,386 | A * | 9/1978 | Kenigsberg ........... | B64C 27/001 244/17.27 |
| 4,362,281 | A * | 12/1982 | Cresap .................. | B64C 27/001 188/379 |
| 5,230,407 | A * | 7/1993 | Smith ................... | B64C 27/001 188/281 |
| 7,461,815 | B2 * | 12/2008 | Almeras ............... | B64C 27/001 244/17.27 |
| 8,474,802 | B2 * | 7/2013 | Nicq ...................... | F16F 1/445 188/281 |

(Continued)

*Primary Examiner* — Bradley T King
(74) *Attorney, Agent, or Firm* — Perman & Green, LLP

(57) ABSTRACT

A vibration damper including a frame having at least a first cavity, a frame first end and a frame second end spaced from the frame first end; a shaft slidably coupled to and extending into the frame where the shaft extends through the first cavity; a first vibration isolator disposed within the first cavity where the shaft extends through the first vibration isolator so as to capture the first vibration isolator within the first cavity where the first vibration isolator interfaces with the frame second end; and a second vibration isolator disposed on the shaft, where the shaft extends through the second vibration isolator so as to capture the second vibration isolator on the shaft where the second vibration isolator interfaces with the frame second end opposite the first vibration isolator, where the first vibration isolator and the second vibration isolator act only in compression.

20 Claims, 12 Drawing Sheets

(56) References Cited

U.S. PATENT DOCUMENTS

| | | | |
|---|---|---|---|
| 9,016,448 B2 | 4/2015 | Ludin et al. | |
| 2006/0043654 A1* | 3/2006 | Allaei | F16F 1/44 267/140.3 |
| 2011/0210491 A1* | 9/2011 | Tavares | F16F 1/3732 267/153 |
| 2011/0316209 A1* | 12/2011 | Kerr | B60G 13/02 267/293 |
| 2012/0193850 A1* | 8/2012 | Szekely | F16F 1/3732 267/292 |

* cited by examiner

VIBRATION DAMPING LINK AND METHOD THEREFORE

BACKGROUND

1. Field

The aspects of the present disclosure generally relate to vibration isolation and in particular to vibration damping links used to dampen tension and compression forces,

2. Brief Description of Related Developments

Generally, vibration isolation is obtained by mounting a vibration producing element such as an engine or turbine on a resilient member. In one aspect, the resilient member is an elastic dampening member such as a rubber bushing. In other aspects, metallic springs may be used to dampen vibrations; however, metallic springs are heavier and more sensitive to fatigue than their elastomeric counterparts. The increased weight may be undesirable in fields such as aerospace due to increased fuel costs and lifting capacities of the aerospace vehicles. In still other aspects, fluid dampers may be used, but again fluid dampers are heavier than their elastomeric counterparts and cannot react quickly enough to dampen high frequency vibrations. In addition, fluid dampers are more difficult to tailor for natural frequency vibrations than other conventional vibration dampers. Pneumatic dampers may also be used but the pneumatic dampers do not have the reliability of an elastomeric based design.

In addition, conventional vibration isolation using elastomeric designs are generally used where the elastomer is subjected to both tension and compression loads, e.g., the ends of the elastomer are chemically or mechanically bonded to links of the vibration damper.

SUMMARY

The following is a non-exhaustive list of examples, which may or may not be claimed, of the subject matter according to the present disclosure.

One example of the subject matter according to the present disclosure relates to a tension and compression vibration damper comprising: a frame defining a vibration damper actuation axis and having at least a first cavity, a frame first end and a frame second end longitudinally spaced from the frame first end along the vibration damper actuation axis; a shaft slidably coupled to and extending into the frame along the vibration damper actuation axis where the shaft includes a first end and a second end and extends through the first cavity; a first vibration isolator disposed within the first cavity where the shaft extends through the first vibration isolator so as to capture the first vibration isolator within the first cavity where the first vibration isolator interfaces with the frame second end; and a second vibration isolator disposed on the shaft, where the shaft extends through the second vibration isolator so as to capture the second vibration isolator on the shaft where the second vibration isolator interfaces with the frame second end opposite the first vibration isolator, where the first vibration isolator and the second vibration isolator are opposingly arranged relative to the frame second end and act only in compression to dampen both tension loads and compression loads applied to the tension and compression vibration damper.

Another example of the subject matter according to the present disclosure relates to a vehicle comprising: a frame; and a tension and compression vibration damper coupled to the frame, the tension and compression vibration damper including a frame defining a vibration damper actuation axis and having at least a first cavity, a frame first end and a frame second end longitudinally spaced from the frame first end along the vibration damper actuation axis; a shaft slidably coupled to and extending into the frame along the vibration damper actuation axis where the shaft includes a first end and a second end and extends through the first cavity; a first vibration isolator disposed within the first cavity where the shaft extends through the first vibration isolator so as to capture the first vibration isolator within the first cavity where the first vibration isolator interfaces with the frame second end; and a second vibration isolator disposed on the shaft, where the shaft extends through the second vibration isolator so as to capture the second vibration isolator on the shaft where the second vibration isolator interfaces with the frame second end opposite the first vibration isolator, where the first vibration isolator and the second vibration isolator are opposingly arranged relative to the frame second end and act only in compression to dampen both tension loads and compression loads applied to the tension and compression vibration damper.

Still another example of the subject matter according to the present disclosure relates to a method of damping vibrations, the method comprising: coupling a vibration producing component to a frame with a tension and compression vibration damper that includes a frame defining a vibration damper actuation axis and having at least a first cavity, a frame first end and a frame second end longitudinally spaced from the frame first end along the vibration damper actuation axis; a shaft slidably coupled to and extending into the frame along the vibration damper actuation axis where the shaft includes a first end and a second end and extends through the first cavity; a first vibration isolator disposed within the first cavity where the shaft extends through the first vibration isolator so as to capture the first vibration isolator within the first cavity where the first vibration isolator interfaces with the frame second end; and a second vibration isolator disposed on the shaft, where the shaft extends through the second vibration isolator so as to capture the second vibration isolator on the shaft where the second vibration isolator interfaces with the frame second end opposite the first vibration isolator; and damping vibrations produced by the vibration producing component with the a tension and compression vibration damper, where the first vibration isolator and the second vibration isolator are opposingly arranged relative to the frame second end and act only in compression to dampen both tension loads and compression loads applied to the tension and compression vibration damper by the vibration producing component.

BRIEF DESCRIPTION OF THE DRAWINGS

Figure 1:
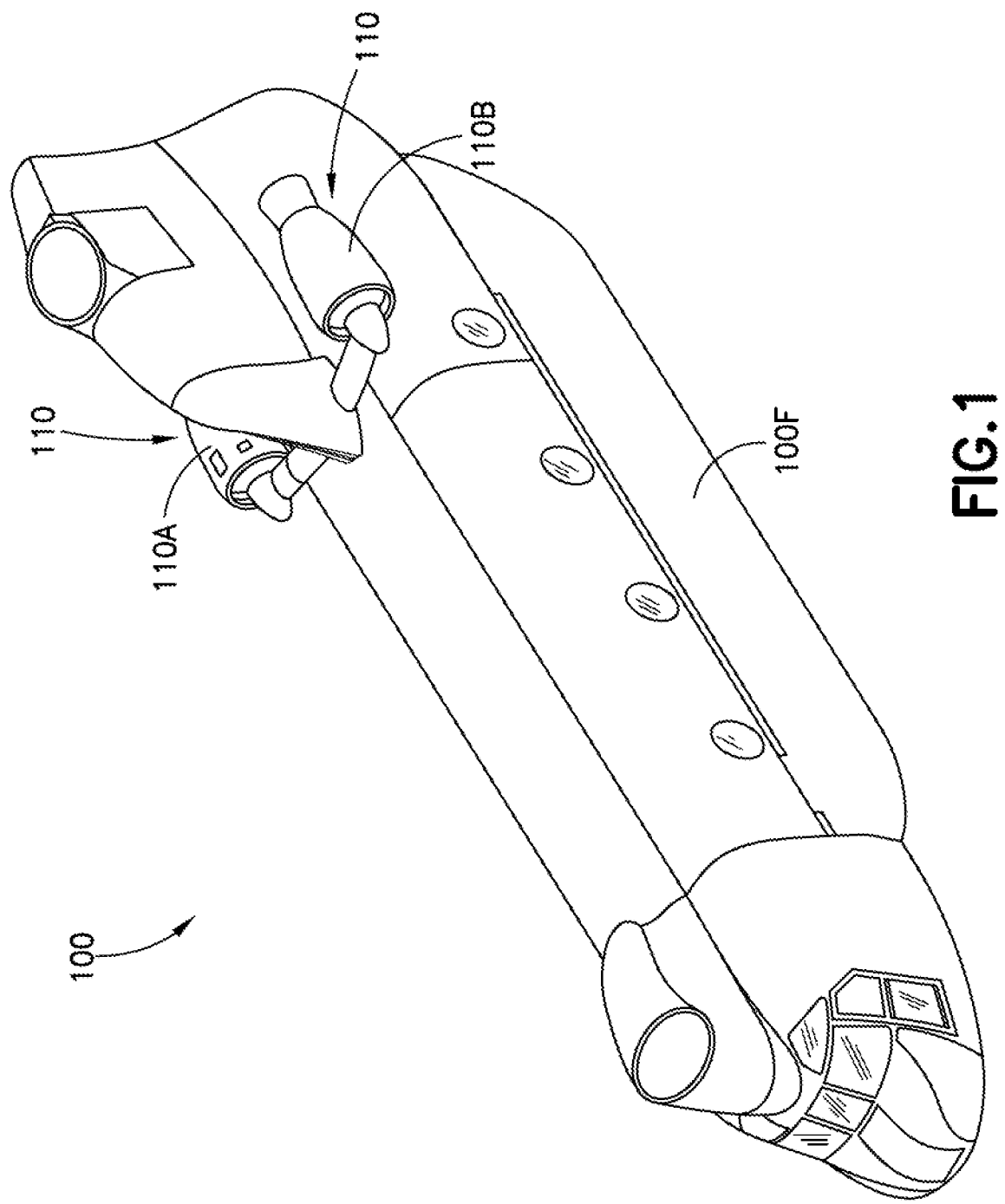
Figure 2:
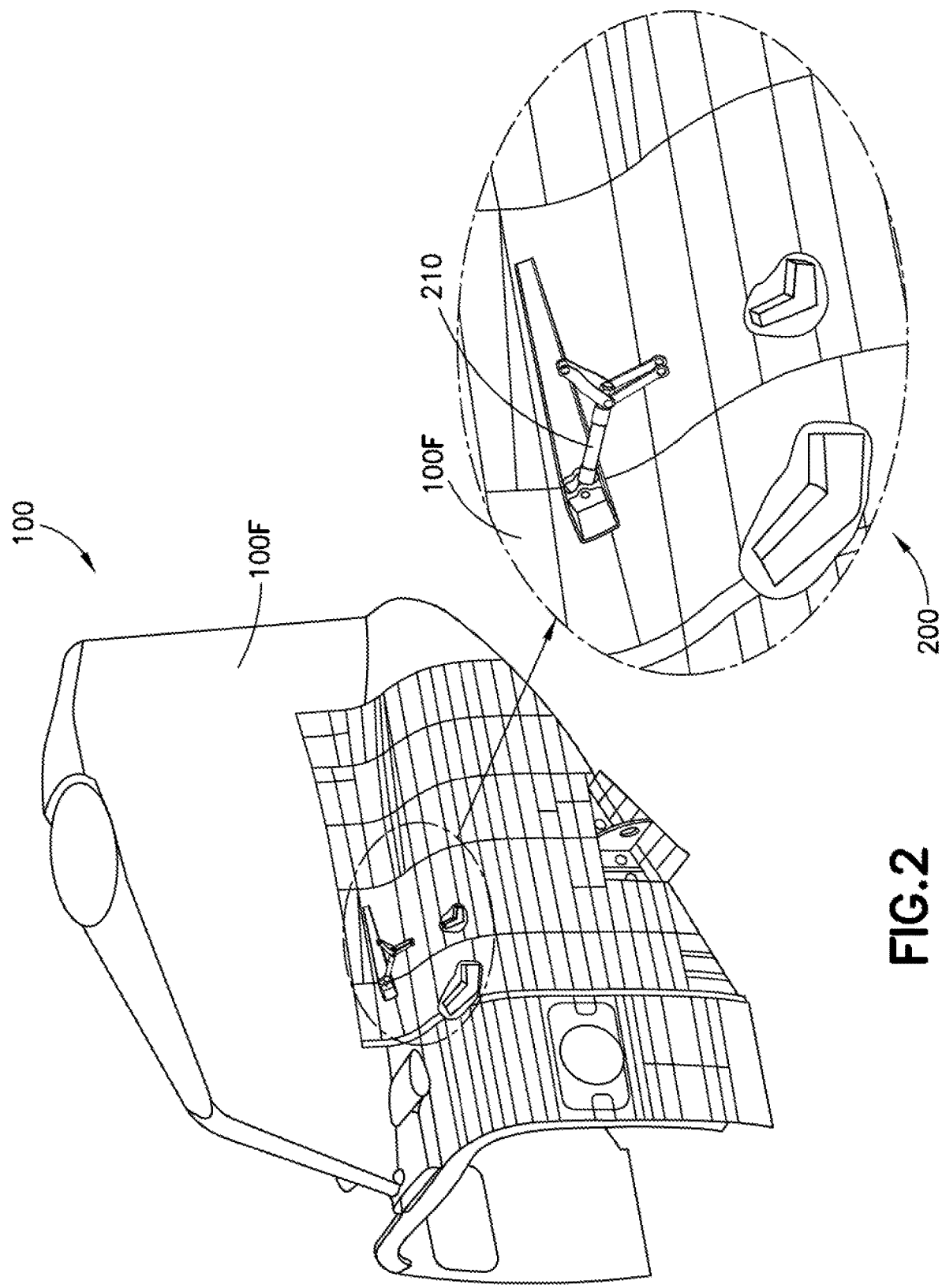
Figure 3A:
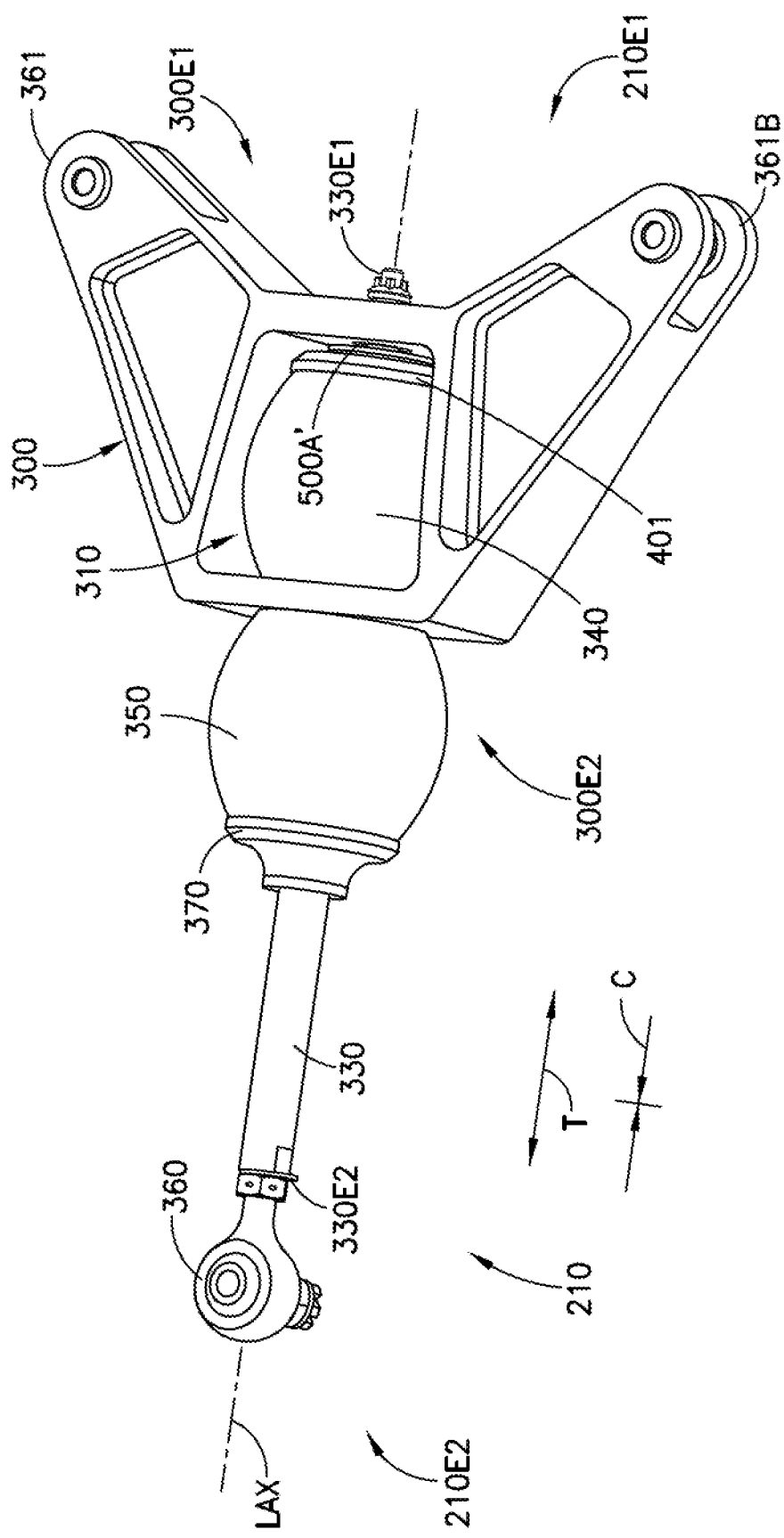
Figure 3B:
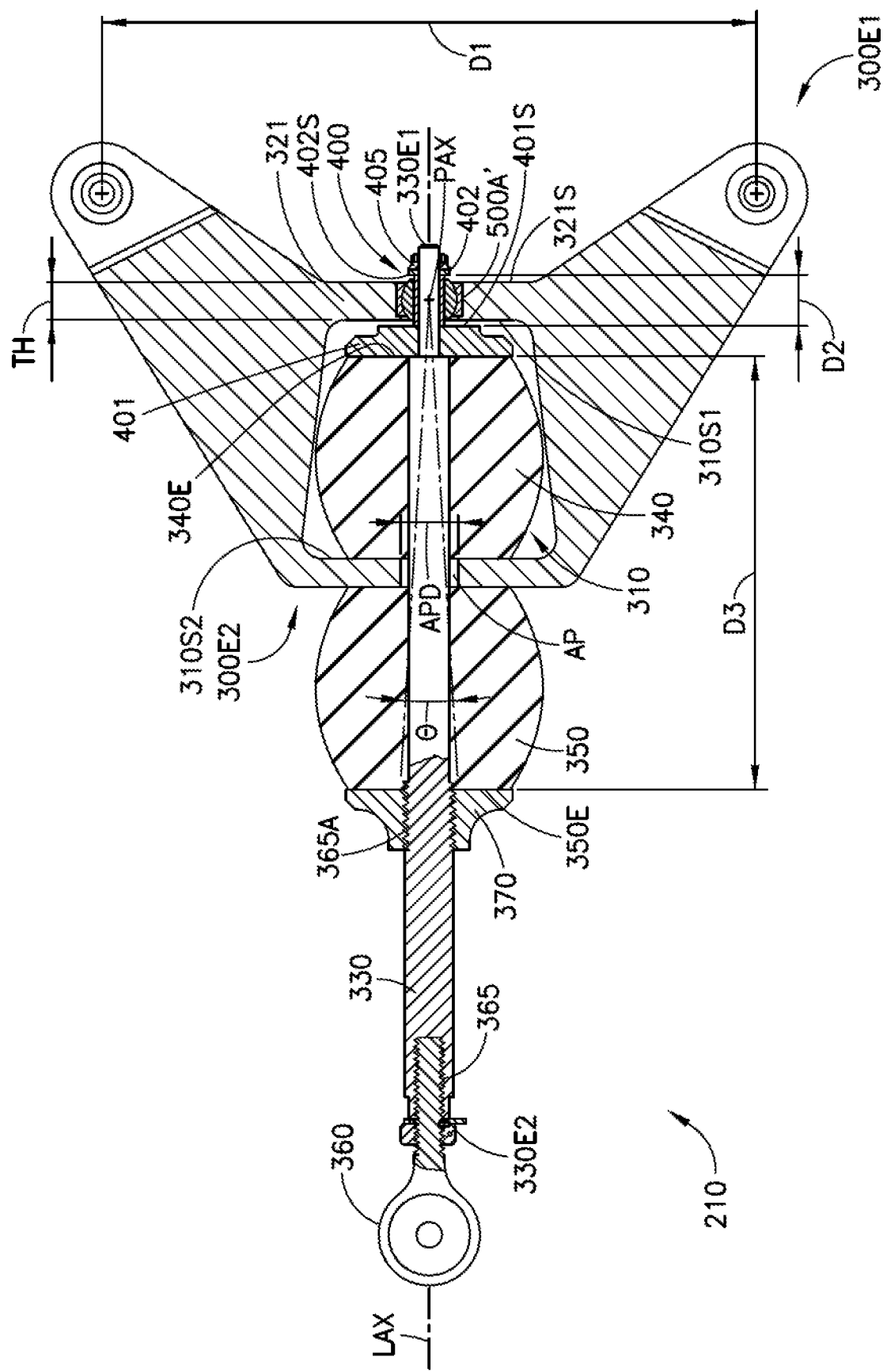
Figure 4A:
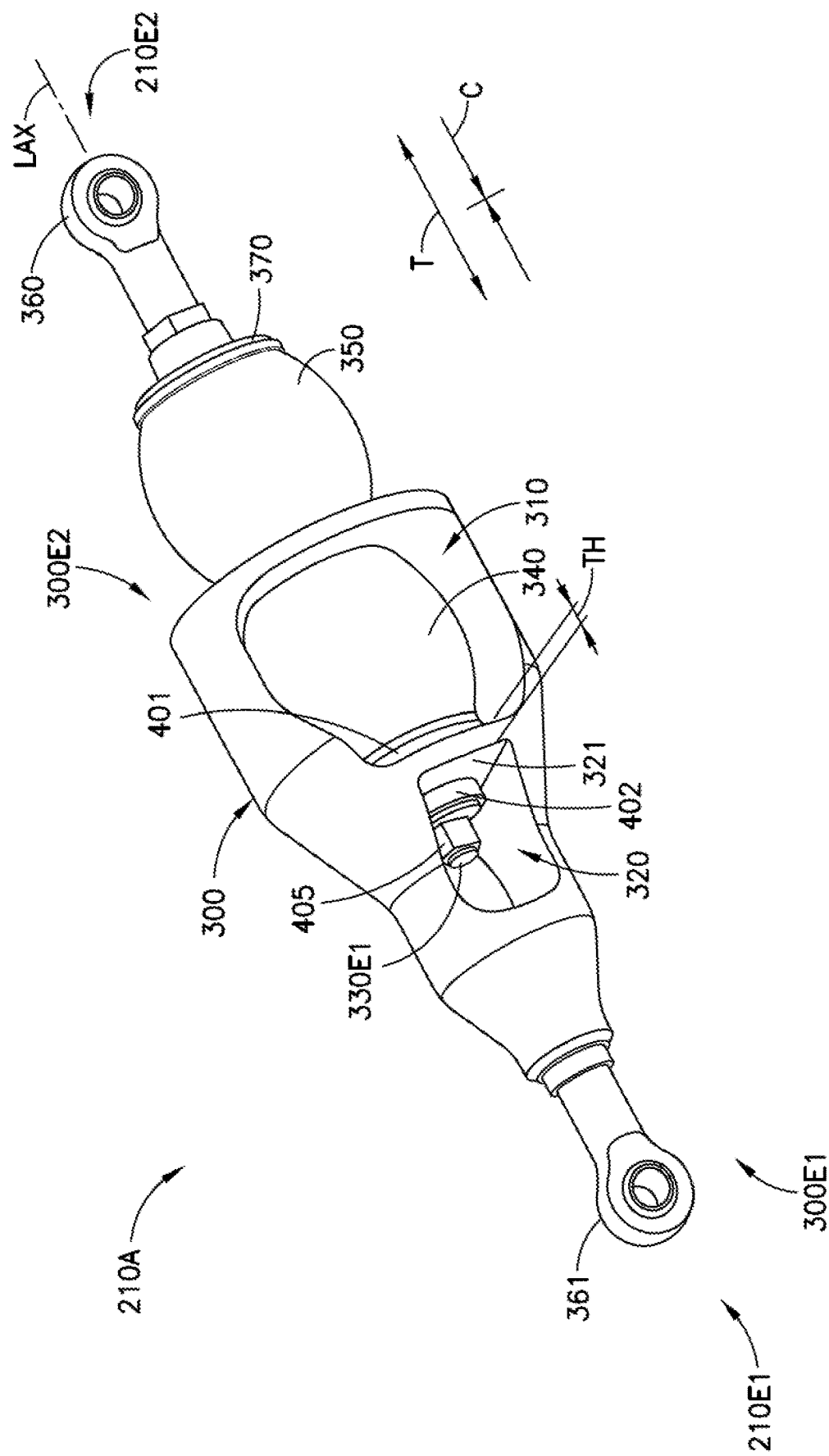
Figure 4B:
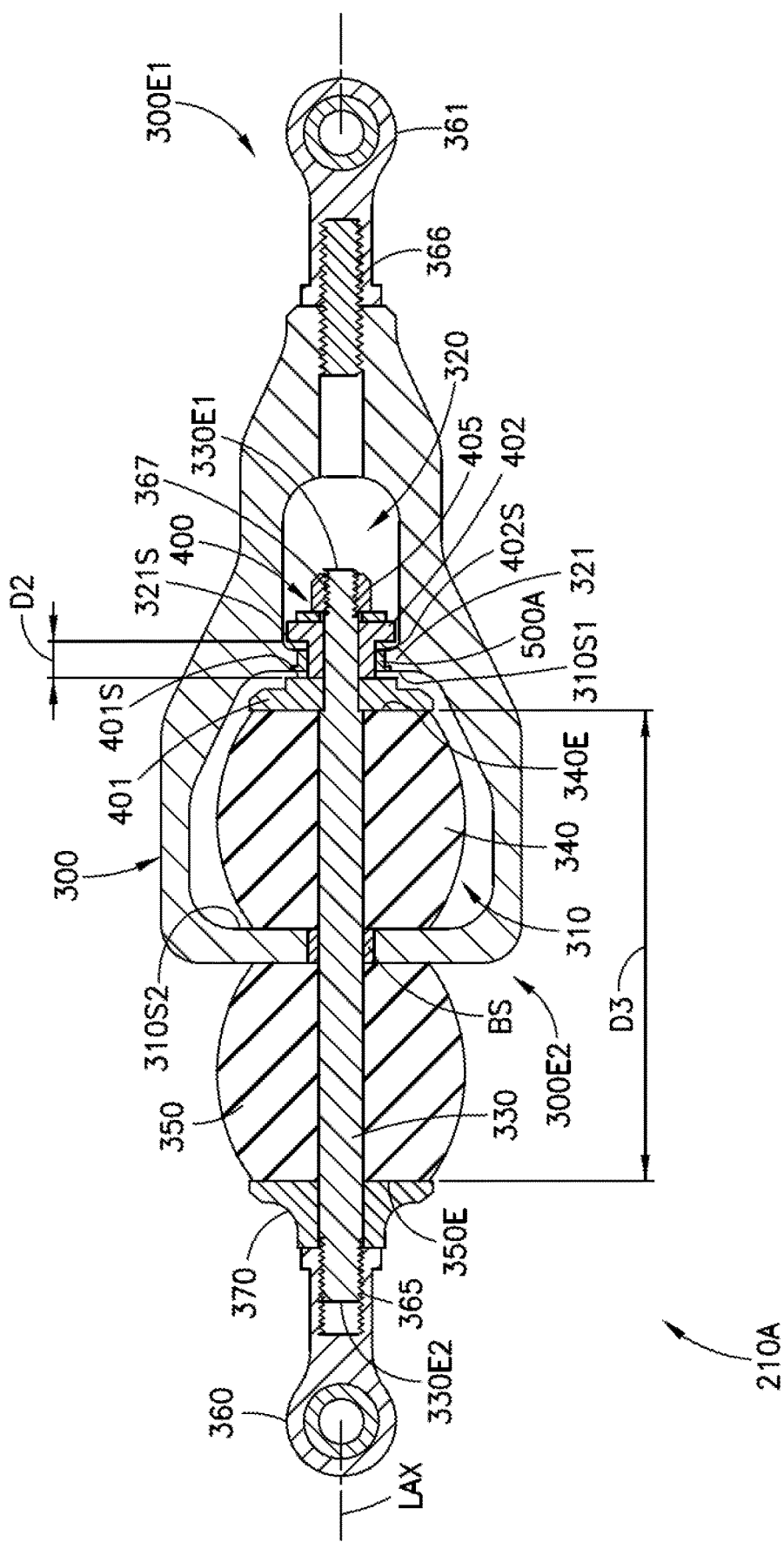
Figure 5A:
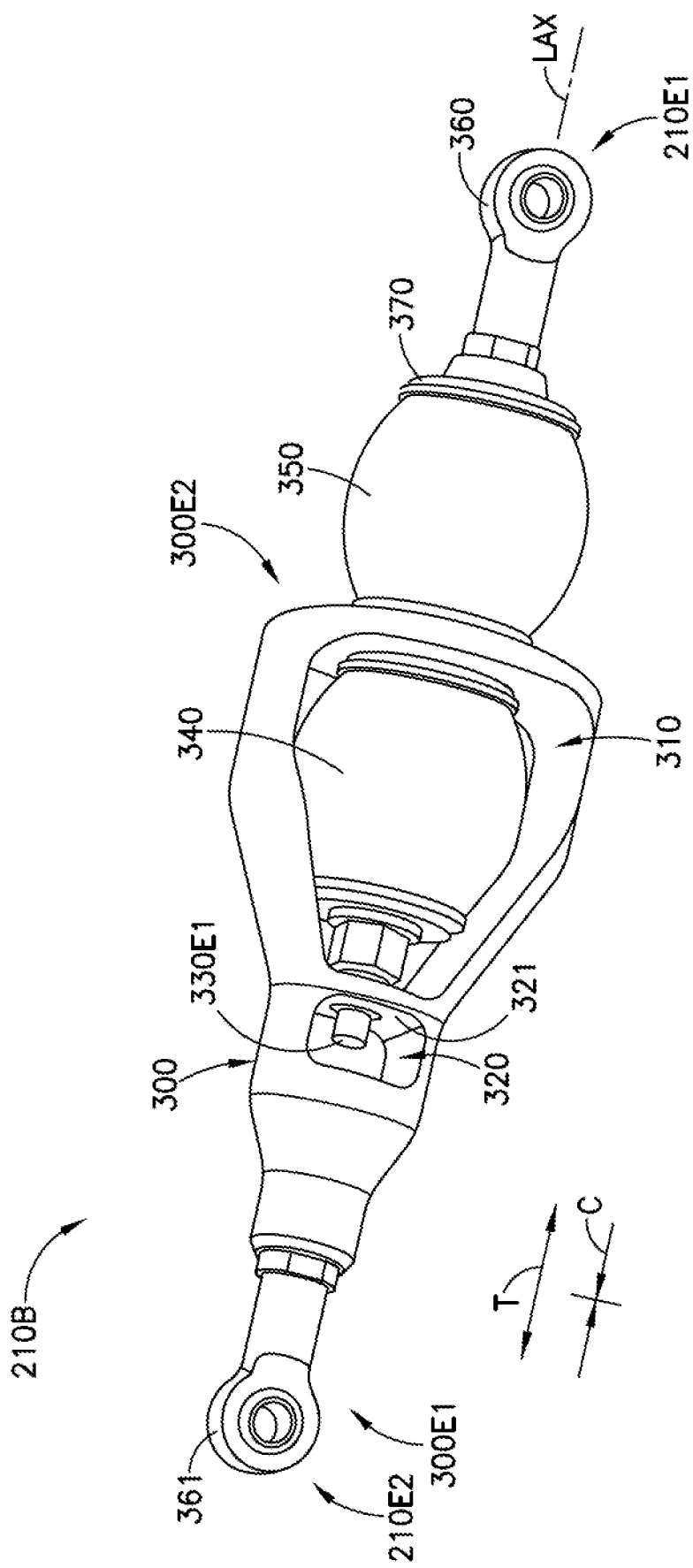
Figure 5B:
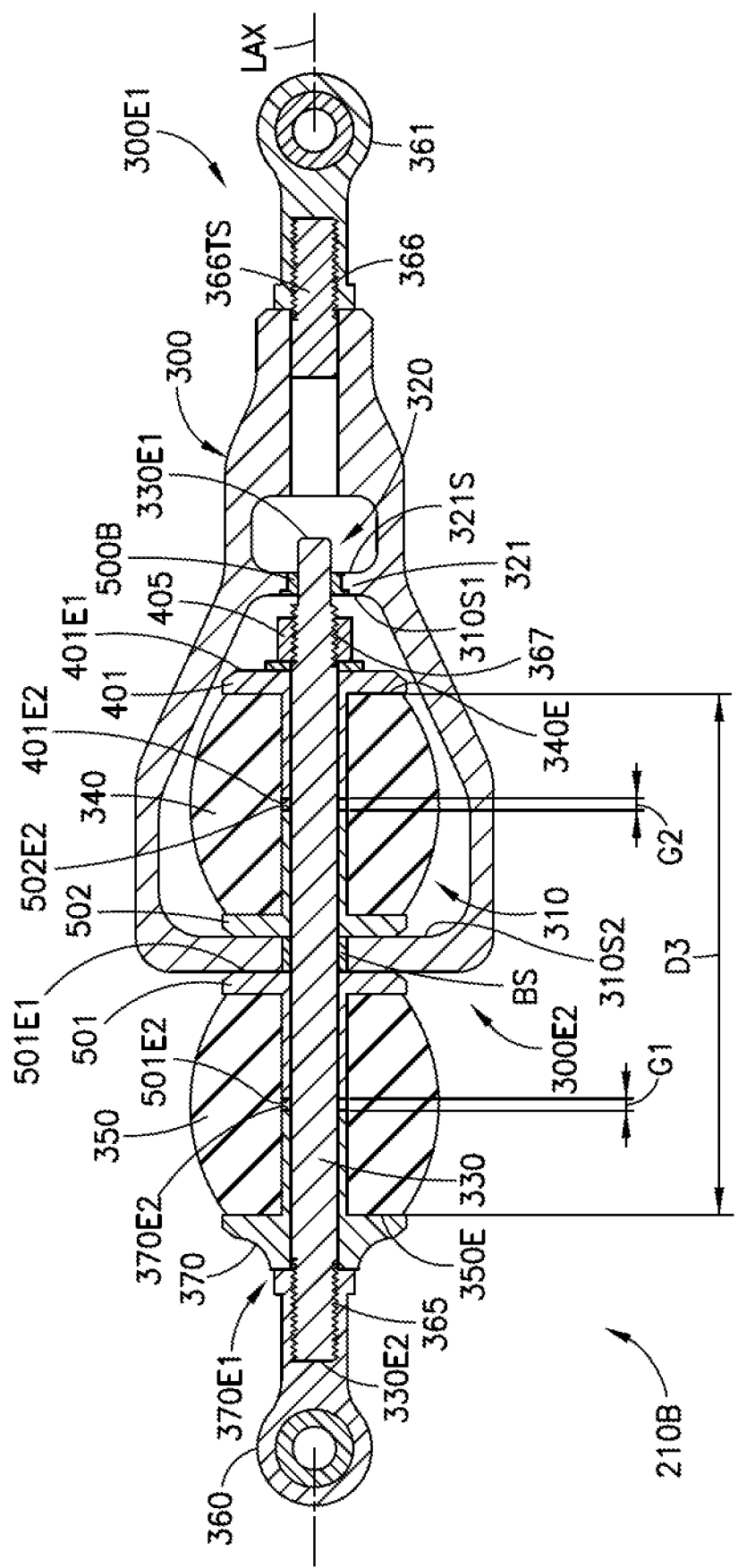
Figure 6A:
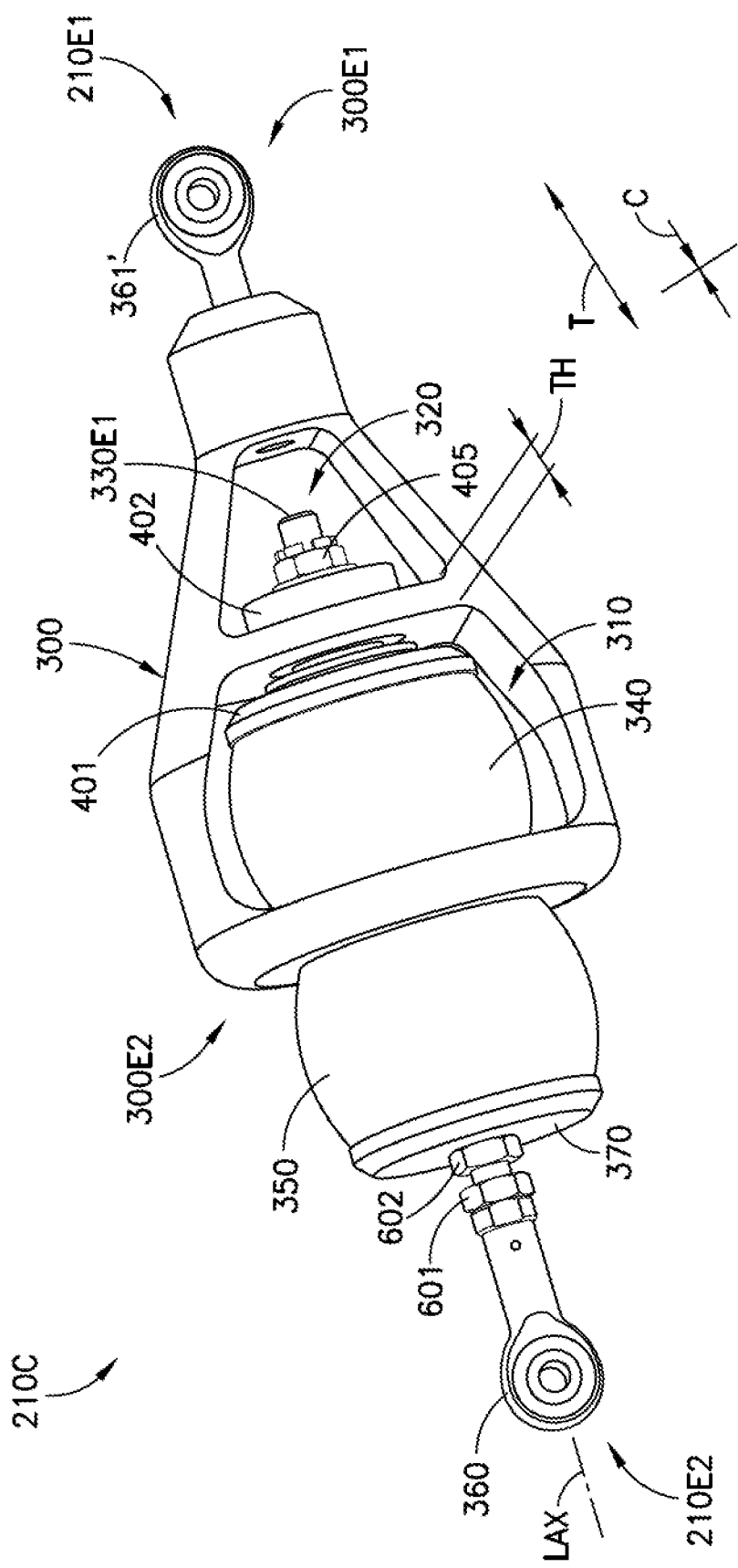
Figure 6B:
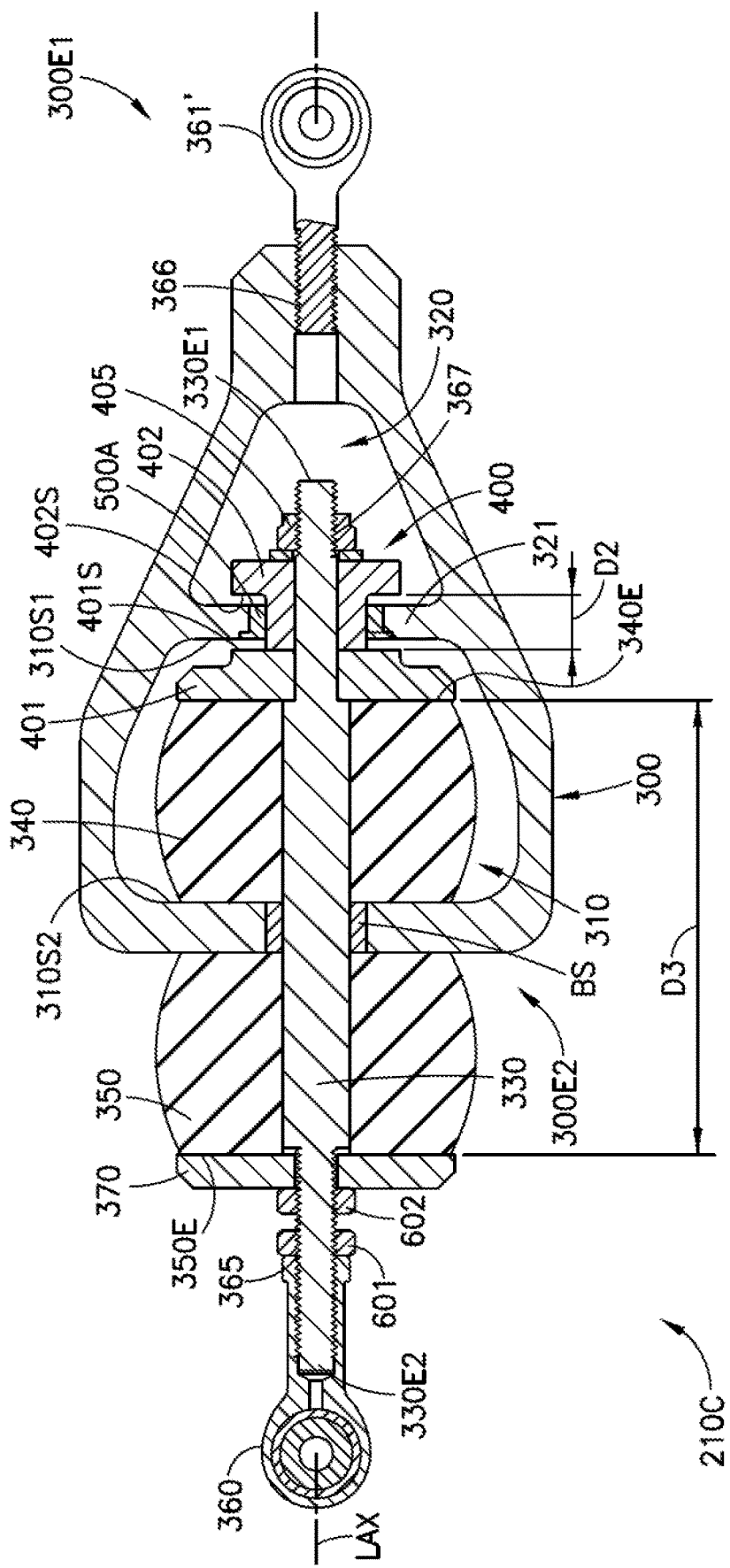
Figure 6C:
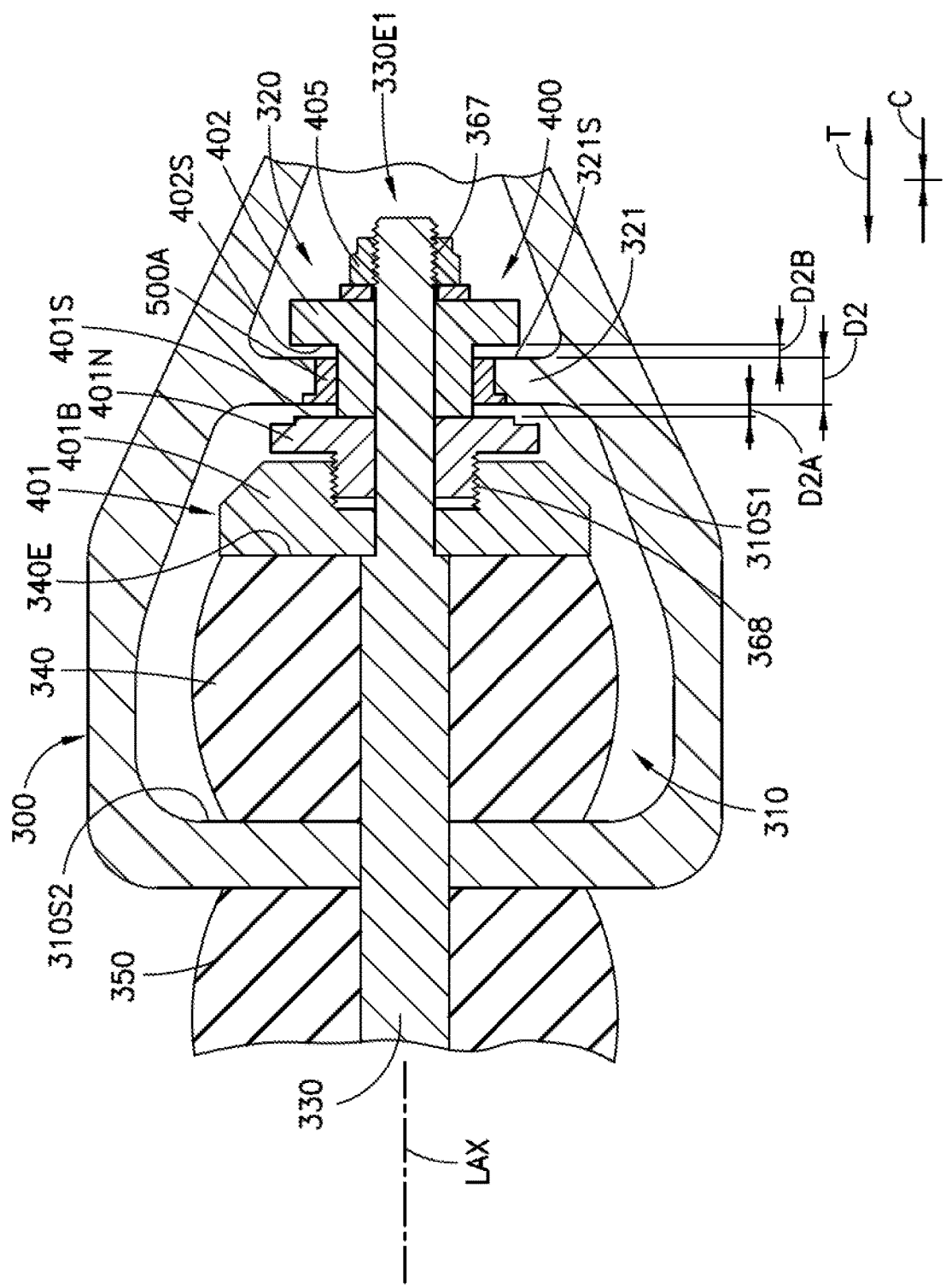
Figure 7:
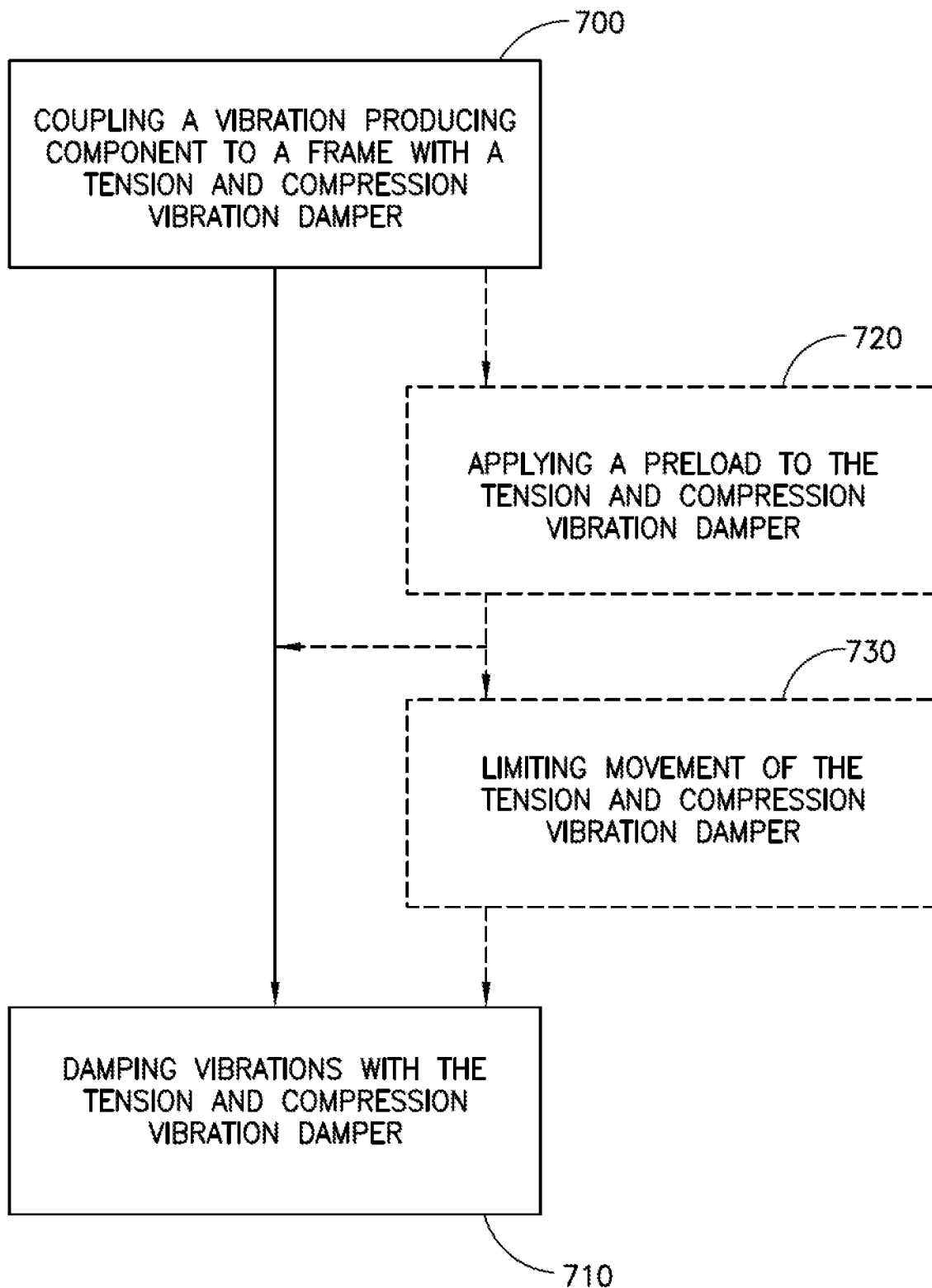

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a schematic illustration of an aerospace vehicle in accordance with aspects of the present disclosure;

FIG. 2 is a schematic illustration of a portion of the aerospace vehicle of FIG. 1 in accordance with aspects of the present disclosure;

FIG. 3A is a schematic isometric view of a tension and compression vibration damper in accordance with aspects of the present disclosure;

FIG. 3B is a schematic plan view of the tension and compression vibration damper of FIG. 3A in accordance with aspects of the present disclosure;

FIG. 4A is a schematic isometric view of a tension and compression vibration damper in accordance with aspects of the present disclosure;

FIG. 4B is a schematic plan view of the tension and compression vibration damper of FIG. 4A in accordance with aspects of the present disclosure;

FIG. 5A is a schematic isometric view of a tension and compression vibration damper in accordance with aspects of the present disclosure;

FIG. 5B is a schematic plan view of the tension and compression vibration damper of FIG. 5A in accordance with aspects of the present disclosure;

FIG. 6A is a schematic isometric view of a tension and compression vibration damper in accordance with aspects of the present disclosure;

FIG. 6B is a schematic plan view of the tension and compression vibration damper of FIG. 6A in accordance with aspects of the present disclosure;

FIG. 6C is a schematic plan view of a portion of the tension and compression vibration damper of FIGS. 4A, 4B, 6A and 6B in accordance with aspects of the present disclosure; and FIG. 7 is a flow diagram of a method in accordance with aspects of the present disclosure.

DETAILED DESCRIPTION

Referring to FIGS. 3A-6B, the aspects of the present disclosure provide a structural support link, referred to herein as a tension and compression vibration damper 210, 210A, 210B, 210C, configured to dampen vibrations through the absorption of energy by applying only compressive forces to at least one vibration isolator 340, 350 of the tension and compression vibration damper 210, 210A, 210B, 210C regardless of whether the tension and compression vibration damper 210, 210A, 210B, 210C is placed in tension or compression. As noted above, the tension and compression vibration damper 210, 210A, 210B, 210C only loads the at least one vibration isolator 340, 350 in compression (i.e. no tension loads are applied to the at least one vibration isolator 340, 350) while still acting as a two force member (e.g. FIGS. 4A-6C) or a three force member (FIGS. 3A-3B) loaded in either tension or compression. As such, tension and compression vibration damper 210, 210A, 210B, 210C of the aspects of the present disclosure have a simpler design than conventional vibration dampers while eliminating bonding of other materials (such as a metal frame of a vibration damper) to the dampening material, as well as eliminating any mechanical connection that would load the dampening material in tension. In addition, the tension and compression vibration damper 210, 210A, 210B, 210C of the present disclosure include two-way stoppage devices (i.e. also referred to as hard stops) that transition the tension and compression vibration damper 210, 210A, 210B, 210C to a rigid member at predetermined deflections or loads or in the absence of compression capability of the at least one vibration isolator 340, 350. In the aspects, of the present disclosure, the at least one vibration isolator 340, 350 comprises a thermoplastic material, viscoelastic material or other suitable elastomer that does not bond readily to other materials (such as through friction, heat generated by friction, or environmental conditions).

Referring now to FIGS. 1 and 2, the aspects of the present disclosure will be described herein with respect to an aerospace vehicle such as a rotary wing aircraft or vehicle 100 but it should be understood that the aspects of the disclosed embodiment may be applied to any suitable industry, such as the maritime, automotive and manufacturing industries. In one aspect, the vehicle 100 includes a frame 100F (such as an airframe) and at least one vibration producing component 110 coupled to the frame 100F. In one aspect, the at least one vibration producing component 110 is one or more engines 110A, 110B each coupled to the frame by a respective engine mount 200. In one aspect, each engine mount 200 includes a tension and compression vibration damper 210; while tension and compression vibration damper 210 is illustrated in FIG. 2, in other aspects any of the tension and compression vibration dampers 210, 210A, 210B, 210B may be used in the respective engine mount 200.

Referring generally to FIGS. 3A-6B, the tension and compression vibration damper 210, 210A, 210B, 210C of the present disclosure includes a frame 300 defining a vibration damper actuation axis LAX and having at least a first cavity 310, a frame first end 300E1 and a frame second end 300E2 longitudinally spaced from the frame first end 300E1 along the vibration damper actuation axis LAX. A shaft 330 is slidably coupled to and extends into the frame 300 along the vibration damper actuation axis LAX where the shaft 330 includes a first end 330E1 and a second end 330E2. In one aspect, the shaft 330 extends through the first cavity 310. A first vibration isolator 340 disposed within the first cavity 310 where the shaft 330 extends through the first vibration isolator 340 so as to capture the first vibration isolator 340 within the first cavity 310. The first vibration isolator 340 interfaces with the frame second end 300E2. A second vibration isolator 350 is disposed on the shaft 330, where the shaft 330 extends through the second vibration isolator 350 so as to capture the second vibration isolator 350 on the shaft 330. The second vibration isolator 350 interfaces with the frame second end 300E2 opposite the first vibration isolator 340, where the first vibration isolator 340 and the second vibration isolator 350 are opposingly arranged relative to the frame second end 300E2 and act only in compression to dampen both tension loads T and compression loads C applied to the tension and compression vibration damper 210, 210A, 210B.

In one aspect, the tension and compression vibration damper 210, 210A, 210B, 210C of the present disclosure includes a first damper mounting member 360. In one aspect, the first end 330E1 of the shaft 330 extends through the first cavity 310 and the first damper mounting member 360 is coupled to the second end 330E2 of the shaft 330 so that the second vibration isolator 350 is disposed between the first damper mounting member 360 and the frame second end 300E2. In one aspect, the first damper mounting member 360 is coupled to the second end 330E2 of the shaft 330 with a threaded coupling 365 that in one aspect provides for preload adjustment of the first vibration isolator 340 and the second vibration isolator 350 as will be described herein. It is noted that preloading places the first vibration isolator 340 and the second vibration isolator 350 in compression, where in one aspect the amount of preload may be negligible and serve merely to remove or minimize any gaps between the fist vibration isolator 340, the second vibration isolator 350, the frame 300, and bushing members 370, 401, 501, 502 (e.g. to minimize undamped movement of the tension and compression vibration damper 210, 210A, 210B, 210C); while in other aspects the preloading may compress the first vibration isolator 340 and the second vibration isolator 350 to any suitable predetermined compressive load. In still other aspects, the first vibration isolator 340 and the second vibration isolator 350 may not be preloaded. The first damper mounting member 360 may be coupled to the shaft 330 in any suitable manner. For example, in one aspect, a jam nut 601 may be provided on the shaft 330, as illustrated in FIGS. 6A and 6B so that jam nut 601 can be tightened against the first damper mounting member 360 to fix the location/position of the first damper mounting member 360 along the vibration damper actuation axis LAX.

In one aspect, a first bushing member 370 is disposed on the shaft 330 between the second vibration isolator 350 and the second end 330E2 of the shaft 330. As such, the first bushing member 370 is also disposed between the second vibration isolator 350 and the first damper mounting member 360. In one aspect, the first bushing member 370 may be formed with the first damper mourning member 360 as a monolithic unit; while in other aspects, the first bushing member 370 is formed independent of the first damper mounting member 360. In one aspect, the second vibration isolator 350 is held captured on the shaft 330 between the first bushing member 370 and the frame second end 300E2 so that the second vibration isolator 350 is compressed between the first bushing member 370 and the frame second end 300E2 when the tension and compression vibration damper 210, 210A, 210B, 210C is placed in compression. In one aspect, the first bushing member 370 is adjustably coupled to the shaft 330 so that a position of the first bushing member 370 along the vibration damper actuation axis LAX is adjustable. Adjustment of the first bushing member 370 may be provided through a threaded engagement 365, between the shaft 330 and the first bushing member as illustrated in FIGS. 3A and 3B so that the first bushing member is held against the second vibration isolator 350; while in other aspects, as illustrated in FIGS. 4A-5B, adjustment of the first bushing member 370 may be provided adjusting a position of the first damper mounting member 360 along the shaft 330, as described above, where the first damper mourning member 360 holds the first bushing member 370 against the second vibration isolator 350 to preload the second vibration isolator 350. In still other aspects, as shown in FIGS. 6A and 6B, the position of the first bushing member 370 along the vibration damper actuation axis LAX is provided by a jam nut 602 that is threadably engaged to the shaft 330, such as by threaded coupling 365, where the jam nut 602 holds the first bushing member 370 against the second vibration isolator 350 to, e.g. preload second vibration isolator 350 against the frame second end 300E2. While movement of the first bushing member 370 along the vibration damper actuation axis LAX preloads the second vibration isolator 350 against the frame second end 300E2; movement of the first bushing member 370 along the vibration damper actuation axis LAX also preloads the first vibration isolator 340 against the frame second end 300E2 by reducing the distance D3 between opposing ends 340E, 350E of the first vibration isolator 340 and the second vibration isolator 350.

Still referring to FIGS. 3A-6B, in one aspect, the tension and compression vibration damper 210, 210A, 210B, 2100 includes at least one second damper mounting member 361, 361', 361A, 361E disposed adjacent the frame first end 300E1. In one aspect, the at least one second damper mounting member 361, 361', 361A, 361B is formed with the frame 300 as a monolithic member. For example, referring to FIGS. 3A and 3B the frame 300 includes two second damper mounting members 261A, 261E that are laterally spaced from one another by a distance D1 relative to the vibration damper actuation axis LAX. Having more than one second damper mounting member 261A, 261E formed by the frame 300 spatially fixes the position of the frame 300 (e.g. fixes a first end 210E1 of the tension compression vibration damper 210) the relative to, for example, a component to which the frame 300 is coupled, which in one aspect, may be the vibration producing component 110 or the frame 110F of the vehicle 100, while the first damper mounting member provides pivoting movement of the second end 210E2 of the tension compression vibration damper 210. In other aspects, as illustrated in FIGS. 4A-6B the second damper mounting member 361, 361' is coupled to the frame first end 300E1 with a threaded coupling 366 so that the second damper mounting member 361, 361' is movable along the vibration damper actuation axis LAX towards and away from the first damper mounting member 360, e.g. to adjust an overall length of the tension and compression vibration damper 210A, 210B, 210C. In one aspect, the threaded coupling 366 may be such that the frame 300 has internal threads and the second damper mounting member 361' has external threads (where the second damper mounting member 361 is threaded into the frame) as illustrated in FIGS. 6A and 6B; in other aspects, as shown in FIGS. 5A and 5B the threaded coupling 366 may be such that the frame 300 has external threads (such as on a threaded stud 366TS) and the second damper mounting member 361 includes internal threads for threading the second damper mounting member 361 onto the threaded stud 366TS; while in still other aspects, the second damper mounting member 361, 361' may be coupled to the frame with any suitable threaded coupling 366. While the second damper mounting member 361, 361' is illustrated as being coupled to the frame 300 with the threaded coupling 366 in other aspects, the second damper mounting member 361 may be integrally formed with the frame as a monolithic unit. In one aspect, having a single second damper mounting member 361, 361' provides for pivoting movement of the first end 210E1 of the tension and compression vibration damper 210A, 210B, 210C relative to, for example, the component to which the frame 300 is coupled, which in one aspect, may be the vibration producing component 110 or the frame 110F of the vehicle 100.

In accordance with the aspects of the present disclosure, still referring to FIGS. 3A-6B, the frame 300 is configured to provide longitudinal movement of the shaft 330 along the vibration damper actuation axis LAX so that the tension and compression vibration damper 210, 210A, 210B, 210C can absorb the tension loads T and the compression loads C. For example, the frame 300 includes one or more bushings 500A, 500A', 500B, BS or apertures AP through which the Shaft 330 extends, where the bushings 500A, 500A', 500B, BS or apertures AP provide for longitudinal movement of the shaft 330 along the vibration damper actuation axis LAX in the direction of tension loads T and the compression loads C relative to the frame 300.

In one aspect, the frame 300 comprises a wall 321 that forms a first end surface 310S1 of the first cavity 310 that is longitudinally spaced along the vibration damper actuation axis LAX from a second end surface 310S2 of the first cavity 310 that is adjacent the second end 300E2 of the frame 300. In one aspect, the wall 321 includes a guide bushing member 500A, 100A', 500B and the first end 330E1 of the shaft 330 extends through the guide bushing member 500A, 500A', 500B, where the guide bushing member 500A, 500A', 500B is configured to at least guide sliding movement of the shaft 330 relative to the frame 300 in the direction of the tension loads T and the compression loads C along the vibration damper actuation axis LAX.

Referring to FIGS. 4A-6B, the guide bushing member 500A, 500B is any suitable bushing that is coupled to the wall 321 in any suitable manner; while in other aspects the guide bushing member 500A may be integrally formed with the wall 321. In one aspect, a second guide bushing member BS is coupled to the frame 300 at the second end 300E2 of the frame 300 so that the second guide bushing member BS extends through the second end surface 310S2 of the first cavity 310 and the guide bushing member 500A, 500B extends through the first end surface 310S1 of the first cavity 310 in an opposing spatial relationship. In one aspect, the guide bushing member 500A, 500B and the second guide bushing member BS are arranged in-line with each other along the vibration damper actuation axis LAX so that the shaft 330 is common to and extends through both of the guide bushing member 500A, 500B and the second guide bushing member BS got guided longitudinal movement of the shaft in the direction of the tension loads T and the compression loads C along the vibration damper actuation axis LAX. In one aspect, referring to FIGS. 4A-6B, the frame 300 further comprises a second cavity 320 where the wall 321 of the frame 300 separates the first cavity 310 and the second cavity 320 and the shaft 330 extends through the wall 321 (e.g. through the guide bushing member 500A, 500B) into the second cavity 320.

Referring to FIGS. 4A, 4B, 6A and 6B, the tension and compression vibration damper 210A, 210C includes a displacement limiting member 400 disposed on the shaft 330 and extending through the wall 321 (e.g. through the guide bushing member 500A). In one aspect, the displacement limiting member 400 includes a second bushing member 401 disposed within the first cavity 310 and a third bushing member 402 disposed within the second cavity 320 where the second bushing member 401 and the third bushing member 402 cooperate with each other and opposite sides of the wall 321 (e.g. such as first end surface 310S1 and wall surface 321S) to limit relative movement between the frame 300 and the shaft 330. For example, at least one of the second bushing member 401 and the third bushing member 402 slidably engages the wall 321 by extending through the guide bushing member 500A. In the aspect illustrated in FIGS. 4A, 4B, 6A and 6B the third bushing member extends through the guide bushing member 500A but in other aspects the second bushing member may extend through the guide bushing member 500A. In one aspect, the second bushing member 401 includes a second bushing shoulder 401S facing the wall 321 and the third bushing member 402 includes a third bushing shoulder 402S facing the wall 321, where a distance D2 between the second bushing shoulder 401S and the third bushing shoulder 402S is greater than a thickness TH of the wall 321 to define an amount of travel of the shaft 330 along the vibration damper actuation axis LAX. In one aspect, the shaft extends through each of the second bushing member 401 and the third bushing member 402 where the second bushing member 401 and the third bushing member 402 are held on the shaft and against each other (so as to define the distance D2) with, for example, a coupling member 405 that may be coupled to the shaft 330 by a threaded coupling 367. As can be seen in FIG. 4A, 4B, 6A and 6B the first vibration isolator 340 is captured on the shaft 330 between the second bushing member 401 and the second end 300E2 (such as second end surface 310S2) of the frame 300.

Referring also to FIG. 6C, in one aspect, the second bushing member 401 of the displacement limiting member 400 includes a second bushing member body 401B and a second bushing member nut 401N that is coupled to the second bushing member body 401E with a threaded coupling 368. The threaded coupling 368 is configured to provide relative movement between the second bushing member body 401E and the second bushing member nut 401N in the direction of the tension forces T and the compression forces C. The relative movement between the second bushing member body 401B and the second bushing member nut 40 IN provides for an adjustment of a size of the gap D2. For example, as the first vibration isolator 340 and the second vibration isolator 350 are preloaded the distance D2A between the second bushing shoulder 301S and the wall 321 may be different than the distance D2B between the second bushing shoulder 401S and the wall 321. The relative movement between the second bushing member body 401E and the second bushing member nut 401N provides for maintaining the preload on the first vibration isolator 340 (and the second vibration isolator 350) while maintaining the distances D2A and D2B substantially equal to each other (or different from each other if the amount of extension is desired to be different than an amount of compression of the tension and compression vibration damper 210A, 210C). Relative movement between the second bushing member body 401B and the second bushing member nut 401N does not change the overall length of the tension and compression vibration damper 210A, 210C.

Referring now to FIGS. 3A and 3B, the frame 300 of the tension and compression vibration damper 210 includes the guide bushing member 500A' coupled to the wall 321 and an aperture AP that extends through the second end 300E2 of the frame 300. In this aspect, the displacement limiting member 400 is disposed on the shaft 330 and extends through the wall 321 in a manner substantially similar to that described above with respect to FIGS. 4A, 4B, 6A and 6B. In the manner described above, the displacement limiting member 400 includes the second bushing member 401 disposed within the first cavity 310 and a third bushing member 402 disposed at least partially outside the first cavity 410 where, as described above, the third bushing member 402 extends through the wall 321 to engage or abut the second bushing member 401. As described above, the second bushing member 401 and the third bushing member 402 cooperate with each other and the wall 321 to limit relative movement between the frame 300 and the shaft 330. In this aspect, the guide bushing member 500A' is configured to both guide sliding movement of the displacement limiting member 400 relative to the frame 300 along the vibration damper actuation axis LAX and guide pivoting movement of the displacement limiting member 400 relative to the frame 300 about pivot axis PAX. For example, the guide bushing member 500A' is configured as a spherical bearing that defines the pivot axis PAX. The third bushing member 402 extends through the guide bushing member 500A' so that third bushing member 402 provides the shaft 330 with a conical displacement area defined by the angle θ. The angle θ, in turn, is defined by a diameter APD of the aperture AP.

Referring to FIGS. 5A and 5B, in one aspect, the tension and compression vibration damper 210B includes the first bushing member 370 disposed on the shaft 330 and a fourth bushing member 501 disposed on the shaft 330, where the second vibration isolator 350 is disposed between the first bushing member 370 and the fourth bushing member 501. The tension and compression vibration damper 210B also includes the second bushing member 401 disposed on the shaft 330 and a fifth bushing member 502 disposed on the shaft, where the first vibration isolator 340 is disposed between the second bushing member 401 and the fifth bushing member 502. In this aspect, the first bushing member 370 includes a first end 370E1 and a second end 370E2 and the fourth bushing member 501 includes first end 501E1 and a second end 501E2. At least one of the first bushing member 370 and the fourth bushing member 501 extend into the second vibration isolator 350 so that a gap G1 is defined between the second end 370E2 of the first bushing member 370 and the second end 501 of the fourth bushing member 501. The gap G1 defines, at least in part, an amount of relative longitudinal movement between the frame 300 and the Shaft 330 along the vibration damper actuation axis LAX in the direction of the tension loads T and the compression loads C. In one aspect, the second vibration isolator 350 is held captive on the shaft 330 between the first bushing member 370 and the fourth bushing member 501. In one aspect, the fourth bushing member 501 includes a first end 501E1 that engages the second end 300E2 of the frame 300.

Still referring to FIGS. 5A and 5B, the second bushing member 401 includes a first end 401E1 and a second end 401E2 and the fifth bushing member 502 includes a first end 502E1 and a second end 502E2. At least one of the second bushing member 401 and the fifth bushing member 502 extend into the first vibration isolator 340 so that a gap G2 is defined between the second end 401E2 of the second bushing member 401 and the second end 502E2 of the fifth bushing member 502. The gap G2 defines at least in part an amount of relative longitudinal movement between the frame 300 and the shaft 330 along the vibration damper actuation axis LAX in the direction of the tension loads T and the compression loads C. In one aspect, the gap (11 defines the amount of relative movement between the shaft 330 and the frame 300 with respect to compression loads C and the gap G2 defines the amount of relative movement between the shaft 330 and the frame 300 with respect to tension loads T. In one aspect, the first vibration isolator 340 is held captive on the shaft 330 between the second bushing member 401 and the fifth bushing member 502.

In the aspect illustrated in FIGS. 5A and 5B, the shaft 330 extends through the first cavity 310 so as to extend through the wall 321 of the first cavity 310, where the wall 321 includes the guide bushing member 500B. In this aspect, the first end 330E1 of the shaft 330 extends through the guide bushing member 500B where the guide bushing member 500B, in combination with second guide bushing member BS, is configured to guide sliding movement of the shaft 330 relative to the frame 300 in the direction of the tension loads T and the compression loads C along the vibration damper actuation axis LAX. In a manner substantially similar to that described above, coupling member 405 is coupled to the shaft 330 by, for example, threaded coupling 367 so that the coupling member 405 abuts the second bushing member 401 to, at least in part, place the first vibration isolator 340 an the second vibration isolator 350 under preload. For example, tightening the coupling member 405 may cause the first bushing member 370 and the coupling member 405 to move towards each other to adjust the distance D3 between the first bushing member 370 and the second bushing member 401 which in turn adjusts the gaps G1, G2 for preloading the first vibration isolator 340 an the second vibration isolator 350 and defining the amount of relative movement between the shaft 330 and the frame 300 (noting that the fourth and fifth bushing members 501, 502 are held against the second end 300E2 of the frame 300 under compression of the first and second vibration isolators 340, 350). Similarly, in other aspects, tightening the first damper mounting member 360 (along or in combination with tightening of the coupling member 405) on the shaft 330 may cause the first bushing member 370 and the coupling member 405 to move towards each other to adjust the gaps G1, G2 and to preload the first vibration isolator 340 an the second vibration isolator 350.

In one aspect, referring to FIGS. 3A-6B, once the first vibration isolator 340 and the second vibration isolator 350 are preloaded, the first bushing member 370 may be pinned or otherwise fixed to the shaft 330. Pinning (e.g. placing a pin through the first bushing member 370 and the shaft or other chemical/mechanical fastening) the first bushing member 370 to the shaft 330 couples the first bushing member 370 to the shaft 330 so that a position of the first bushing member 370 is fixed relative to the shaft 330 along the vibration damper actuation axis LAX to prevent tampering of the tension and compression vibration damper 210, 210A, 210B, 210C. In other aspects, the second bushing member 401 and/or the coupling member 405 may be fixed to the shaft 330 to prevent tampering of the tension and compression vibration damper 210, 210A, 210B, 210C.

Referring now to FIG. 7 as well as FIGS. 2 and 3A-6B, an exemplary operation of the a tension and compression vibration damper 210, 210A, 210B, 210C will be described in accordance with aspects of the present disclosure. In one aspect, the vibration producing component 110 is coupled to the frame 100F of the vehicle 100 with the tension and compression vibration damper 210, 210A. 210B, 210C (FIG. 7, Block 700). For example, the first end 210E1 of the tension and compression vibration damper 210, 210A, 210B, 210C is coupled to the vibration producing component 110 using the second damper mounting member 361, 361', 361A, 361B. The second end 210E2 of the tension and compression vibration damper 210, 210A, 210B, 210C is coupled to the frame 100F using the first damper mounting member 360. In one aspect, vibrations produced by the vibration producing component 110 are damped with the tension and compression vibration damper 210, 210A, 210B, 210C (FIG. 7, Block 710) such that the first vibration isolator 340 and the second vibration isolator 350 are only placed in compression during the damping (i.e. there are no tension loads present at any time within the first vibration isolator 340 and the second vibration isolator 350). For example, as the tension and compression vibration damper 210, 210A, 210B, 210C is placed in compression the first bushing member 370 is caused to move, through the sliding relative movement between the shaft 330 and the frame 300, towards the second end 300E2 of the frame 300. The movement of the first bushing member 370 towards the second end of the frame 300 compresses the second vibration isolator 350 against the second end of the frame 300 to dampen the compression loads C applied to the tension and compression vibration damper 210, 210A, 210B, 210C, noting that relative movement between the shaft 330 and the frame 300 (and hence relative movement between the first damper mounting member 360 and the second damper mounting member 361, 361', 361A, 361B) is limited or restricted in the manner described above, such as with the displacement limiting member 400 ardor the aperture AP. As described above, the first vibration isolator 340 is preloaded in compression between the frame second end 300E2 of the frame 300 and the second bushing member 401 so that as the second vibration isolator 350 is compressed under the compression loads C, the first vibration isolator 340 merely expands to reduce its preload but is not placed in tension between the frame second end 300E2 of the frame 300 and the second bushing member 401.

Similarly, as the tension and compression vibration damper 210, 210A 210B, 210C is placed in tension the second hushing member 401 is caused to move, through the sliding relative movement between the shaft 330 and the frame 300, towards the frame second end 300E2 of the frame 300. The movement of the second bushing member 401 towards the frame second end of the frame 300 compresses the first vibration isolator 340 against the frame second end 300E2 of the frame 300 to dampen the tension loads T applied to the tension and compression vibration damper 210. 210A, 210B, 210C, noting that relative movement between the shaft 330 and the frame 300 (and hence relative movement between the first damper mounting member 360 and the second damper mounting member 361, 361', 361A, 361B) is limited or restricted in the manner described above, such as with the displacement limiting member 400 and/or the aperture AP. As described above, the second vibration isolator 350 is preloaded in compression between the frame second end 300E2 of the frame 300 and the first bushing member 370 so that as the first vibration isolator 340 is compressed under the tension loads T, the second vibration isolator 350 merely expands to reduce its preload but is not placed in tension between the frame second 300E2 end of the frame 300 and the first bushing member 370.

In one aspect, as described above, a preload may be applied to the first vibration isolator 340 and the second vibration isolator 350 (FIG. 7, Block 720) before or after the tension and compression vibration damper 210, 210A, 210B, 210C is coupled to the frame 100F and/or the vibration producing component 110. In one aspect, as described above, the movement of the tension and compression vibration damper 210, 210A, 210B, 210C is limited (FIG. 7, Block 730) by limiting relative movement between the frame 300 and the shaft 330 independent of the first vibration isolator 340 and the second vibration isolator 350. For example, as described above, the displacement limiting member 400 provides a gap or distance D2, or the gaps G1, G2 are provided between the first and fourth bushing members 370, 501 and between the second and fifth bushing members 401, 502 respectively, where the distance D2 and gaps G1, G2 define the amount of relative movement between the shaft 330 and the frame. The mechanical interface between the displacement limiting member 400 and the wall 321, and the mechanical interface between the first and fourth bushing members 370, 501 and the frame second end 300E2 of the frame 300 as well as the mechanical interface between the second and fifth bushing members 401, 502 and the frame second end 300E2 of the frame 300, provides a hard stop in the tension and compression directions of the tension and compression vibration damper 210, 210A, 210B, 210C which places the tension and compression vibration damper 210, 210A, 210B, 210C in a substantially rigid configuration (so as to act/function as a solid rod) at the limits of relative movement.

The following are provided in accordance with the aspects of the present disclosure:

A1. A tension and compression vibration damper comprising:

a frame defining a vibration damper actuation axis and having at least a first cavity, a frame first end and a frame second end longitudinally spaced from the frame first end along the vibration damper actuation axis;

a shaft slidably coupled to and extending into the frame along the vibration damper actuation axis where the shaft includes a first end and a second end and extends through the first cavity;

a first vibration isolator disposed within the first cavity where the shaft extends through the first vibration isolator so as to capture the first vibration isolator within the first cavity where the first vibration isolator interfaces with the frame second end; and a second vibration isolator disposed on the shaft, where the shaft extends through the second vibration isolator so as to capture the second vibration isolator on the shaft where the second vibration isolator interfaces with the frame second end opposite the first vibration isolator, where the first vibration isolator and the second vibration isolator are opposingly arranged relative to the frame second end and act only in compression to dampen both tension loads and compression loads applied to the tension and compression vibration damper.

A2. The tension and compression vibration damper of paragraph A1, further comprising:

a first damper mounting member; and wherein the first end of the shaft extends through the first cavity and the first damper mounting member is coupled to the second end of the shaft.

A3. The tension and compression vibration damper of paragraph A2, wherein the first damper mounting member is coupled to the second end of the shaft with a threaded coupling.

A4. The tension and compression vibration damper of paragraph A1, further comprising a first bushing member disposed on the shaft between the second vibration isolator and the second end of the shaft.

A5. The tension and compression vibration damper of paragraph A4, wherein the second vibration isolator is held captured on the shaft between the first bushing member and the frame second end.

A6. The tension and compression vibration damper of paragraph A4, wherein the first bushing member is adjustably coupled to the shaft so that a position of the first bushing member along the vibration damper actuation axis is adjustable.

A7. The tension and compression vibration damper of paragraph A1, further comprising at least one second damper mounting member disposed adjacent the frame first end.

A8. The tension and compression vibration damper of paragraph A7, wherein the at least one second damper mounting member is formed with the frame as a monolithic member.

A9. The tension and compression vibration damper of paragraph A7, wherein the at least one second damper mounting member includes two second damper mounting members laterally spaced from one another relative to the vibration damper actuation axis.

A10. The tension and compression vibration damper of paragraph A7, wherein the at least one second damper mounting member is coupled to the frame first end with a threaded coupling.

A11. The tension and compression vibration damper of paragraph A1, wherein the frame further comprises a wall that forms a first end surface of the first cavity that is longitudinally spaced along the vibration damper actuation axis from a second end surface of the first cavity.

A12. The tension and compression vibration damper of paragraph A11, wherein the frame further comprises a second cavity where the wall of the frame separates the first cavity and the second cavity and the shaft extends through the wall into the second cavity.

A13. The tension and compression vibration damper of paragraph A12, further comprising a displacement limiting member disposed on the shaft and extending through the wall, the displacement limiting member includes a second bushing member disposed within the first cavity and a third bushing member disposed within the second cavity where the second bushing member and the third bushing member cooperate with each other and the wall to limit relative movement between the frame and the shaft.

A14. The tension and compression vibration damper of paragraph A13, wherein at least one of the second bushing member and the third bushing member slidably engages the wall, the second bushing member includes a first bushing shoulder facing the wall and the third bushing member includes a third bushing shoulder facing the wall, where a distance between the second bushing shoulder and the third bushing shoulder is greater than a thickness of the wall.

A15. The tension and compression vibration damper of paragraph A13, wherein the wall includes a guide bushing member configured to guide sliding movement of the displacement limiting member relative to the frame.

A16. The tension and compression vibration damper of paragraph A13, wherein the first vibration isolator is captured on the shaft between the second bushing member and the frame second end of the frame.

A17. The tension and compression vibration damper of paragraph A11, wherein the wall includes a guide bushing member and the first end of the shaft extends through the guide bushing member, the guide bushing member being configured to guide sliding movement of the shaft relative to the frame.

A18. The tension and compression vibration damper of paragraph A17, further comprising:
a displacement limiting member disposed on the shaft and extending through the wall, the displacement limiting member includes a second bushing member disposed within the first cavity and a third bushing member disposed at least partially outside the first cavity where the second bushing member and the third bushing member cooperate with each other and the wall to limit relative movement between the frame and the shaft; and
the guide bushing member is configured to both guide sliding movement of the displacement limiting member relative to the frame and guide pivoting movement of the displacement limiting member relative to the frame.

A19. The tension and compression vibration damper of paragraph A18, wherein at least one of the second bushing member and the third bushing member slidably engages the wall, the second bushing member includes a first bushing shoulder facing the wall and the third bushing member includes a third bushing shoulder facing the wall, where a distance between the second bushing shoulder and the third bushing shoulder is greater than a thickness of the wall.

A20. The tension and compression vibration damper of paragraph A12, further comprising:
a first bushing member disposed on the shaft;
a fourth bushing member disposed on the shaft, where the second vibration isolator is disposed between the first bushing member and the fourth bushing member;
a second bushing member disposed on the shaft; and
a fifth bushing member disposed on the shaft, where the first vibration isolator is disposed between the second bushing member and the fifth bushing member.

A21. The tension and compression vibration damper of paragraph A20 wherein:
the first bushing member includes a second end and the fourth bushing member includes a second end; and
at least one of the first bushing member and the fourth bushing member extend into the second vibration isolator so that a gap is defined between the second end of the first bushing member and the second end of the fourth bushing member, the gap defining at least in part an amount of relative movement between the frame and the shaft.

A22. The tension and compression vibration damper of paragraph A21, wherein the second vibration isolator is held captive on the shaft between the first bushing member and the fourth bushing member.

A23. The tension and compression vibration damper of paragraph A21, wherein the fourth bushing member includes a first end that engages the frame second end of the frame.

A24. The tension and compression vibration damper of paragraph A20, wherein:
the second bushing member includes a second end and the fifth bushing member includes a second end; and
at least one of the second bushing member and the fifth bushing member extend into the first vibration isolator so that a gap is defined between the second end of the second bushing member and the second end of the fifth bushing member, the gap defining at least in part an amount of relative movement between the frame and the shaft.

A25. The tension and compression vibration damper of paragraph A24, wherein the first vibration isolator is held captive on the shaft between the second bushing member and the fifth bushing member.

A26. The tension and compression vibration damper of paragraph A20, wherein the shaft extends through the first cavity so as to extend through a wall of the first cavity, the wall includes a guide bushing member and the first end of the shaft extends through the guide bushing member, the guide bushing member being configured to guide sliding movement of the shaft relative to the frame.

A27. The tension and compression vibration damper of paragraph A1, further comprising:
a first bushing member disposed on the shaft between the second vibration isolator and the second end of the shaft; and
wherein the first bushing member is coupled to the Shaft so that a position of the first bushing member is fixed relative to the shaft along the vibration damper actuation axis.

A28. The tension and compression vibration damper of paragraph A1, wherein the first vibration isolator and the second vibration isolator comprise a thermoplastic material.

B1. A vehicle comprising:
a frame; and
a tension and compression vibration damper coupled to the frame, the tension and compression vibration damper including
a frame defining a vibration damper actuation axis and having at least a first cavity, a frame first end and a frame second end longitudinally spaced from the frame first end along the vibration damper actuation axis;
a shaft slidably coupled to and extending into the frame along the vibration damper actuation axis where the shaft includes a first end and a second end and extends through the first cavity;
a first vibration isolator disposed within the first cavity where the shaft extends through the first vibration isolator so as to capture the first vibration isolator within the first cavity where the first vibration isolator interfaces with the frame second end; and
a second vibration isolator disposed on the shaft, where the shaft extends through the second vibration isolator so as to capture the second vibration isolator on the shaft where the second vibration isolator interfaces with the frame second end opposite the first vibration isolator, where the first vibration isolator and the second vibration isolator are opposingly arranged relative to the frame second end and act only in compression to dampen both tension loads and compression loads applied to the tension and compression vibration damper.

B2. The vehicle of paragraph B1, further comprising:
a first damper mounting member; and
wherein the first end of the shaft extends through the first cavity and the first damper mounting member is coupled to the second end of the shaft.

B3. The vehicle of paragraph B2, wherein the first damper mounting member is coupled to the second end of the shaft with a threaded coupling.

B4. The vehicle of paragraph B1, further comprising a first bushing member disposed on the shaft between the second vibration isolator and the second end of the shaft.

B5. The vehicle of paragraph B4, wherein the second vibration isolator is held captured on the shaft between the first bushing member and the frame second end.

B6. The vehicle of paragraph B4, wherein the first bushing member is adjustably coupled to the shaft so that a position of the first bushing member along the vibration damper actuation axis is adjustable.

B7. The vehicle of paragraph B1, further comprising at least one second damper mounting member disposed adjacent the frame first end.

B8. The vehicle of paragraph B7, wherein the at least one second damper mounting member is formed with the frame as a monolithic member.

B9. The vehicle of paragraph B7, wherein the at least one second damper mounting member includes two second damper mounting members laterally spaced from one another relative to the vibration damper actuation axis.

B10. The vehicle of paragraph B7, wherein the at least one second damper mounting member is coupled to the frame first end with a threaded coupling.

B11. The vehicle of paragraph B1, wherein the frame further comprises a wall that forms a first end surface of the first cavity that is longitudinally spaced along the vibration damper actuation axis from a second end surface of the first cavity.

B12. The vehicle of paragraph B11, wherein the frame further comprises a second cavity where the wall of the frame separates the first cavity and the second cavity and the shaft extends through the wall into the second cavity.

B13. The vehicle of paragraph B12, further comprising a displacement limiting member disposed on the shaft and extending through the wall, the displacement limiting member includes a second bushing member disposed within the first cavity and a third bushing member disposed within the second cavity where the second bushing member and the third bushing member cooperate with each other and the wall to limit relative movement between the frame and the shaft.

B14. The vehicle of paragraph B13, wherein at least one of the second bushing member and the third bushing member slidably engages the wall, the second bushing member includes a first bushing shoulder facing the wall and the third bushing member includes a third bushing shoulder facing the wall, where a distance between the second bushing shoulder and the third bushing shoulder is greater than a thickness of the wall.

B15. The vehicle of paragraph B13, wherein the wall includes a guide bushing member configured to guide sliding movement of the displacement limiting member relative to the frame.

B16. The vehicle of paragraph B13, wherein the first vibration isolator is held captured on the shaft between the second bushing member and the frame second end of the frame.

B17. The vehicle of paragraph B11, wherein the wall includes a guide bushing member and the first end of the shaft extends through the guide bushing member, the guide bushing member being configured to guide sliding movement of the shaft relative to the frame.

B18. The vehicle of paragraph B17, further comprising:
a displacement limiting member disposed on the shaft and extending through the wall, the displacement limiting member includes a second bushing member disposed within the first cavity and a third bushing member disposed at least partially outside the first cavity where the second bushing member and the third hushing member cooperate with each other and the wall to limit relative movement between the frame and the shaft: and
the guide bushing member is configured to both guide sliding movement of the displacement limiting member relative to the frame and guide pivoting movement of the displacement limiting member relative to the frame.

B19. vehicle of paragraph B18, wherein at least one of the second bushing member and the third bushing member slidably engages the wall, the second bushing member includes a first bushing shoulder facing the wall and the third bushing member includes a third bushing shoulder facing the wall, where a distance between the second bushing shoulder and the third bushing shoulder is greater than a thickness of the wall.

B20. The vehicle of paragraph B11, further comprising:
a first hushing member disposed on the shaft;
a fourth bushing member disposed on the shaft, where the second vibration isolator is disposed between the first hushing member and the fourth hushing member;
a second bushing member disposed on the shaft; and
a fifth bushing member disposed on the shaft, where the first vibration isolator is disposed between the second bushing member and the fifth bushing member.

B21. The vehicle of paragraph B20, wherein:
the first bushing member includes a second end and the fourth bushing member includes a second end; and
at least one of the first bushing member and the fourth bushing member extend into the second vibration isolator so that a gap is defined between the second end of the first bushing member and the second end of the fourth bushing member, the gap defining at least in part an amount of relative movement between the frame and the shaft.

B22. The vehicle of paragraph B21, wherein the second vibration isolator is held captive on the shaft between the first bushing member and the fourth bushing member.

B23. The vehicle of paragraph B21, wherein the fourth bushing member includes a first end that engages the frame second end of the frame.

B24. The vehicle of paragraph B20, wherein:
the second bushing member includes a second end and the fifth bushing member includes a second end; and
at least one of the second bushing member and the fifth bushing member extend into the first vibration isolator so that a gap is defined between the second end of the second bushing member and the second end of the fifth bushing member, the gap defining at least in part an amount of relative movement between the frame and the shaft.

B25. The vehicle of paragraph B24, wherein the first vibration isolator is held captive on the shaft between the second bushing member and the fifth bushing member.

B26. The vehicle of paragraph B20, wherein the shaft extends through the first cavity so as to extend through a wall of the first cavity, the wall includes a guide bushing member and the first end of the shaft extends through the guide bushing member, the guide bushing member being configured to guide sliding movement of the shaft relative to the frame.

B27. The vehicle of paragraph B1, further comprising:
a first bushing member disposed on the shaft between the second vibration isolator and the second end of the shaft; and
wherein the first bushing member is coupled to the shaft so that a position of the first bushing member is fixed relative to the shaft along the vibration damper actuation axis.

B28. The vehicle of paragraph B27, wherein the second vibration isolator is held captive between the first bushing member and the frame second end of the frame.

B29. The vehicle of paragraph B1, further comprising a vibration producing component wherein the vibration tension and compression vibration damper couples the vibration producing component to the frame.

B30. The vehicle of paragraph B29, wherein the vibration producing component comprises at least one engine.

B31. The vehicle of paragraph B1, wherein the first vibration isolator (340) and the second vibration isolator comprise a thermoplastic material.

C1. A method of damping vibrations, the method comprising:
coupling a vibration producing component to a frame with a tension and compression vibration damper that includes
a frame defining a vibration damper actuation axis and having at least a first cavity, a frame first end and a frame second end longitudinally spaced from the frame first end along the vibration damper actuation axis;
a shaft slidably coupled to and extending into the frame along the vibration damper actuation axis where the shaft includes a first end and a second end and extends through the first cavity;
a first vibration isolator disposed within the first cavity where the shaft extends through the first vibration isolator so as to capture the first vibration isolator within the first cavity where the first vibration isolator interfaces with the frame second end; and
a second vibration isolator disposed on the shaft, where the shaft extends through the second vibration isolator so as to capture the second vibration isolator on the shaft where the second vibration isolator interfaces with the frame second end opposite the first vibration isolator; and
damping vibrations produced by the vibration producing component with the a tension and compression vibration damper, where the first vibration isolator and the second vibration isolator are opposingly arranged relative to the frame second end and act only in compression to dampen both tension loads and compression loads applied to the tension and compression vibration damper by the vibration producing component.

C2. The method of paragraph C1, further comprising applying a preload to the first vibration isolator and the second vibration isolator.

C3. The method of paragraph C1, further comprising limiting relative movement between the frame and the shaft independent of the first vibration isolator and the second vibration isolator.

In the figures, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that sonic of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIG. 7, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIG. 7 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the foregoing description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein. "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to he included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims, if any, are presented for illustrative purposes only and are not intended to limit the scope of the claimed subject matter to the specific examples provided in the present disclosure.

What is claimed is:

1. A tension and compression vibration damper comprising:
   a frame defining a vibration damper actuation axis and having at least:
      a first cavity,
      a frame first end,
      a frame second end longitudinally spaced from the frame first end along the vibration damper actuation axis, and
      a wall that forms a first end surface of the first cavity that is longitudinally spaced along the vibration damper actuation axis from a second end surface of the first cavity;
   a shaft slidably coupled to and extending into the frame along the vibration damper actuation axis where the shaft includes a first end and a second end and extends through the first cavity;
   a first vibration isolator disposed within the first cavity where the shaft extends through the first vibration isolator so as to capture the first vibration isolator within the first cavity where the first vibration isolator interfaces with the frame second end;
   a second vibration isolator disposed on the shaft, where the shaft extends through the second vibration isolator so as to capture the second vibration isolator on the shaft where the second vibration isolator interfaces with the frame second end opposite the first vibration isolator, where the first vibration isolator and the second vibration isolator are opposingly arranged relative to the frame second end and act only in compression to dampen both tension loads and compression loads applied to the tension and compression vibration damper; and
   a displacement limiting member disposed on the shaft and extending through the wall, the displacement limiting member includes a first bushing member disposed within the first cavity and a second bushing member disposed at least partially outside the first cavity where the first bushing member and the second bushing member cooperate with each other and the wall to limit relative movement between the frame and the shaft.

2. The tension and compression vibration damper of claim 1, further comprising:
   a first damper mounting member; and
   wherein the first end of the shaft extends through the first cavity and the first damper mounting member is coupled to the second end of the shaft.

3. The tension and compression vibration damper of claim 2, wherein the first damper mounting member is coupled to the second end of the shaft with a threaded coupling.

4. The tension and compression vibration damper of claim 1, further comprising a third bushing member disposed on the shaft between the second vibration isolator and the second end of the shaft.

5. The tension and compression vibration damper of claim 4, wherein the third bushing member is adjustably coupled to the shaft so that a position of the third bushing member along the vibration damper actuation axis is adjustable.

6. The tension and compression vibration damper of claim 4, wherein the second vibration isolator is held captured on the shaft between the third bushing member and the frame second end.

7. The tension and compression vibration damper of claim 2, further comprising at least one second damper mounting member disposed adjacent the frame first end.

8. The tension and compression vibration damper of claim 7, wherein the at least one second damper mounting member includes two second damper mounting members laterally spaced from one another relative to the vibration damper actuation axis.

9. The tension and compression vibration damper of claim 8, wherein the wall includes a guide bushing member and the first end of the shaft extends through the guide bushing member, the guide bushing member being configured to guide sliding movement of the shaft relative to the frame.

10. The tension and compression vibration damper of claim 9, wherein the guide bushing member is configured to both guide sliding movement of the displacement limiting member relative to the frame and guide pivoting movement of the displacement limiting member relative to the frame.

11. The tension and compression vibration damper of claim 1, wherein the wall includes a guide bushing member and the first end of the shaft extends through the guide bushing member, the guide bushing member being configured to guide sliding movement of the shaft relative to the frame.

12. The tension and compression vibration damper of claim 11, wherein
the guide bushing member is configured to both guide sliding movement of the displacement limiting member relative to the frame and guide pivoting movement of the displacement limiting member relative to the frame.

13. The tension and compression vibration damper of claim 1, wherein the frame further comprises a second cavity where the wall of the frame separates the first cavity and the second cavity and the shaft extends through the wall into the second cavity.

14. The tension and compression vibration damper of claim 13, wherein the second bushing member is disposed within the second cavity.

15. The tension and compression vibration damper of claim 14, wherein the first vibration isolator is captured on the shaft between the first bushing member and the frame second end of the frame.

16. A vehicle comprising:
a vehicle frame; and
a tension and compression vibration damper coupled to the vehicle frame, the tension and compression vibration damper including
a frame defining a vibration damper actuation axis and having at least:
a first cavity,
a frame first end,
a frame second end longitudinally spaced from the frame first end along the vibration damper actuation axis, and
a wall that forms a first end surface of the first cavity that is longitudinally spaced along the vibration damper actuation axis from a second end surface of the first cavity;
a shaft slidably coupled to and extending into the frame along the vibration damper actuation axis where the shaft includes a first end and a second end and extends through the first cavity;
a first vibration isolator disposed within the first cavity where the shaft extends through the first vibration isolator so as to capture the first vibration isolator within the first cavity where the first vibration isolator interfaces with the frame second end;
a second vibration isolator disposed on the shaft, where the shaft extends through the second vibration isolator so as to capture the second vibration isolator on the shaft where the second vibration isolator interfaces with the frame second end opposite the first vibration isolator, where the first vibration isolator and the second vibration isolator are opposingly arranged relative to the frame second end and act only in compression to dampen both tension loads and compression loads applied to the tension and compression vibration damper; and
a displacement limiting member disposed on the shaft and extending through the wall, the displacement limiting member includes a first bushing member disposed within the first cavity and a second bushing member disposed at least partially outside the first cavity where the first bushing member and the second bushing member cooperate with each other and the wall to limit relative movement between the frame and the shaft.

17. The vehicle of claim 16, wherein the first vibration isolator and the second vibration isolator comprise a thermoplastic material.

18. A method of damping vibrations, the method comprising:
coupling a vibration producing component to a frame with a tension and compression vibration damper that includes
a damper frame defining a vibration damper actuation axis and having at least:
a first cavity,
a frame first end,
a frame second end longitudinally spaced from the frame first end along the vibration damper actuation axis, and
a wall that forms a first end surface of the first cavity that is longitudinally spaced along the vibration damper actuation axis from a second end surface of the first cavity;
a shaft slidably coupled to and extending into the frame along the vibration damper actuation axis where the shaft includes a first end and a second end and extends through the first cavity;
a first vibration isolator disposed within the first cavity where the shaft extends through the first vibration isolator so as to capture the first vibration isolator within the first cavity where the first vibration isolator interfaces with the frame second end; and
a second vibration isolator disposed on the shaft, where the shaft extends through the second vibration isolator so as to capture the second vibration isolator on the shaft where the second vibration isolator interfaces with the frame second end opposite the first vibration isolator; and
damping vibrations produced by the vibration producing component with the tension and compression vibration damper, where the first vibration isolator and the second vibration isolator are opposingly arranged relative to the frame second end and act only in compression to dampen both tension loads and compression loads applied to the tension and compression vibration damper by the vibration producing component;
wherein dampened displacement provided by the tension and compression vibration damper is limited by a displacement limiting member disposed on the shaft and extending through the wall, the displacement limiting member includes a first bushing member disposed within the first cavity and a second bushing member disposed at least partially outside the first cavity where the first bushing member and the second bushing member cooperate with each other and the wall to limit relative movement between the frame and the shaft.

19. The method of claim 18, further comprising applying a preload to the first vibration isolator and the second vibration isolator.

20. The method of claim 18, wherein the displacement limiting member limits relative movement between the frame and the shaft independent of the first vibration isolator and the second vibration isolator.

* * * * *